United States Patent
Sano et al.

(10) Patent No.: US 8,409,420 B2
(45) Date of Patent: Apr. 2, 2013

(54) PROCESS FOR PRODUCING CARBONIC ACID GAS SOLUTION, AN APPARATUS FOR THE SAME AND CARBONATED WATER

(75) Inventors: Yoh Sano, Kyoto (JP); Masahiko Asano, Kamakura (JP); Hitoshi Yagi, Shinagawa-ku (JP)

(73) Assignee: Omsi Co., Ltd., Osaka-shi (JP)

( * ) Notice: Subject to any disclaimer, the term of this patent is extended or adjusted under 35 U.S.C. 154(b) by 1363 days.

(21) Appl. No.: 11/917,473

(22) PCT Filed: Jun. 8, 2006

(86) PCT No.: PCT/JP2006/311502
§ 371 (c)(1),
(2), (4) Date: Dec. 13, 2007

(87) PCT Pub. No.: WO2006/134819
PCT Pub. Date: Dec. 21, 2006

(65) Prior Publication Data
US 2009/0297633 A1 Dec. 3, 2009

(30) Foreign Application Priority Data

Jun. 13, 2005 (JP) .................................. 2005-172149
Nov. 22, 2005 (JP) .................................. 2005-337575

(51) Int. Cl.
*C25B 1/22* (2006.01)
*C25B 9/00* (2006.01)
*A61K 8/19* (2006.01)

(52) U.S. Cl. ..................... 205/555; 204/194; 204/229.8; 424/700

(58) Field of Classification Search .................. None
See application file for complete search history.

(56) References Cited

U.S. PATENT DOCUMENTS

| 4,043,881 | A | * | 8/1977 | Yen et al. ..................... 205/552 |
| 5,336,388 | A | * | 8/1994 | Leader et al. ............ 204/403.06 |
| 5,423,454 | A | * | 6/1995 | Lippman et al. ................. 222/1 |
| 5,618,495 | A | * | 4/1997 | Mount et al. .............. 422/82.05 |
| 6,387,228 | B1 | | 5/2002 | Maget |
| 6,780,304 | B1 | * | 8/2004 | Maget .......................... 205/555 |

FOREIGN PATENT DOCUMENTS

| EP | 1 090 677 A1 | 4/2001 |
| JP | 49 41598 | 4/1974 |
| JP | 8 196880 | 8/1996 |
| JP | 2001-019815 A | 1/2001 |

(Continued)

OTHER PUBLICATIONS

Roger Miller, Oxalic Acid, Sep. 9, 1998, web page: fins.actwin.com/aquatic-plants/month.9809/msg00104.html.*

(Continued)

*Primary Examiner* — In Suk Bullock
*Assistant Examiner* — Timothy G Kingan
(74) *Attorney, Agent, or Firm* — Oblon, Spivak, McClelland, Maier & Neustadt, L.L.P.

(57) ABSTRACT

The oxalic acid aqueous solution filled in an electrolytic tank is electrolyzed with an electrolyzer to produce carbonic acid gas, while ultrasonic wave from an ultrasonic generator is applied to the produced carbonic acid gas bubbles, to form micro bubbles, which is dissolved in said oxalic acid aqueous solution, so as to easily produce carbonic acid gas solution with micro carbonic acid gas bubbles dissolved at a low cost; said carbonic acid gas solution can substitute carbonated spring.

2 Claims, 7 Drawing Sheets

FOREIGN PATENT DOCUMENTS

| | | | |
|---|---|---|---|
| JP | 2005-097238 | * | 4/2005 |
| JP | 2006-273775 A | | 10/2006 |

OTHER PUBLICATIONS

U.S. Appl. No. 12/158,810, filed Jun. 23, 2008, Sano, et al.

M. A. Margulis, et al. "Catalytic decarboxylation of oxalic acid in an ultrasonic field" Chemical Abstracts Service, XP-002524970, 1969, 1 page, submitting English Abstract Only.

K.L. Schmidt, "Carbon Dioxide Bath (Carbon Dioxide Spring)", Journal of Artificial Carbonated Spring Research Society, 1 (1), 1998, pp. 005-009 (with English translation).

B. Hartmann et al., "$CO_2$ Balneotherapy for Arterial Occlusion Diseases*: Physiology and Clinical Practice", Journal of Artificial Carbonated Spring Research Society, 1 (1), 1998, pp. 010-016 (with English translation).

* cited by examiner

PROCESS FOR PRODUCING CARBONIC ACID GAS SOLUTION, AN APPARATUS FOR THE SAME AND CARBONATED WATER

FIELD OF THE INVENTION

The present invention relates to a process for producing carbonic acid gas solution with micro bubbles of carbonic acid gas dissolved, an apparatus for the same and carbonated water produced by electrolyzing oxalic acid aqueous solution.

BACKGROUND OF THE INVENTION

Due to the fact that carbonated spring has good thermal retardation effect, carbonated spring has been utilized in thermal spring bath places. It is essentially considered that the thermal retardation effect of carbonated spring is resulted from the dilatation effect of peripheral blood vessels containing carbonic acid gas, which improves the body environment.

In addition, while carbonic acid gas enters into the body through skin, the capillary bed grows and dilates, and whereby improves the blood circulation of skin. Therefore, good therapeutic effect to degenerated pathological changes of organs and peripheral circulation blockage will be obtained.

Up to now, many articles for the effect of carbonated spring have been published (e.g., see non-patent document 1 and non-patent document 2).

As indicated in non-patent document 1, in the repetitive observations by thermal spring doctors in early stage for major direct effects of carbonated spring, Bode of Bad Nauheim observed hyperemic, velutinous, and ruddy skin (1845); Piderit (1836) and Beneke (1859) stated relaxative sense when in carbon dioxide bath and ruddy skin on the bathed part; Goldschieider discussed in 1911 that the ruddy skin stimulated by carbonic acid was possibly caused by movement of blood vessels.

In addition, as indicated in above articles, two impressing direct effects of carbonic acid bath were observed. One effect is the numerous water vapor bubbles on the skin; the other one is ruddy skin (according to Usui's Ischemic Demarcation theory, the immersed part can be distinguished apparently from the non-immersed part). The water vapor bubbles are numerous carbonated water bubbles, which contact the skin closely and act as "gas brush".

Furthermore, as indicated in non-patent document 2, the minimum concentration of carbonic acid gas required for therapy is 400 mg; however, as indicated in non-patent document 1, ruddy skin occurs when the concentration of carbonic acid gas reaches 400 mg.

Since carbonated spring has such good effects, many researches have been developed to produce artificial carbonated spring. For example, one method was disclosed in patent document 1.

The process for producing carbonated spring disclosed in patent document 1 comprises supplying warm water to a carbonic acid gas dissolver with gas dissipation device, releasing the carbonic acid gas as bubbles by utilizing the gas dissipation device immersed in warm water and dissolving the bubbles in the warm water, so as to produce carbonated spring. Wherein, after the carbonic acid gas is dissolved in the warm water in said carbonic acid gas dissolver under pressure, the obtained carbonated spring is sent to a gas separator to reduce the pressure to atmospheric pressure, the volatilized carbonic acid gas from the carbonated spring is introduced into a compressor for recovery by the above gas separator, and the recovered carbonic acid gas is introduced into the above carbonic acid gas dissolver and dissolved in the warm water.

However, as for the process for producing carbonated spring disclosed in patent document 1, a gas dissipation device is required. The gas dissipation device has a porous part, from which the carbonic acid gas forms a large amount of bubbles and is dissolved in warm water.

In addition, other known gas dissipation devices include a device with a hollow linear membrane assembly designed to enclose a perforated tube with front part blocked; wherein, the warm water flowing into the perforated tube flows out from the holes on the perforated tube and contacts with the hollow linear membrane, so that the carbonic acid gas injected from the guide port through the hollow part of the hollow linear membrane is dissolved in the warm water.

However, small particles such as impurities in the warm water may block the porous part of the gas dissipation device or the hollow linear membrane. As a result, the gas dissipation device has to be cleaned or replaced frequently, resulting in huge time waste.

Furthermore, since such machines as a carbonic acid gas bomb, a gas separator, and a compressor are required, the apparatus itself is large in size and high in cost.

In addition, since the conventional process for producing carbonated spring employed a carbonic acid gas bomb to dissolve the pressurized carbonic acid gas in water, the carbonic acid gas undissolved in water was directly released to the atmosphere uselessly, which deviated from the tenet of reducing carbonic acid gas in recent years, and caused adverse effect to the global environment.

A known process for producing carbonic acid gas in aqueous solution without the use of a carbonic acid gas bomb was to utilize bath preparations comprising a carbonic acid gas generator which is composed of carbonate and acid (e.g., see patent document 2).

Patent document 1: Japanese Unexamined Patent Publication No. H11-192421

Patent document 2: Japanese Unexamined Patent Publication No. 2005-97238

Non-patent document 1: K. L. Schmid., Carbonated Bath (Carbonated Spring), *Journal of Artificial Carbonated Spring Research Society*, 1998, 1(1): 005~009.

Non-patent document 2: B. Hartman, M. Pittler, B. Drews, Carbon Dioxide Thermal Spring Recuperation for Arteriole Blockage Patients: Physiology and Clinic, *Journal of Artificial Carbonated Spring Research Society*, 1998, 1(1): 010-016.

SUMMARY OF THE INVENTION

However, the bath preparations comprising a carbonic acid gas generator which is composed of carbonate and acid can just generate a carbonic acid gas with concentration of about 100 ppm, which is by far not enough to deliver the unique effect of carbonated spring, i.e., numerous water vapor bubbles on skin and ruddy skin.

In view of the above problem, in order to dissolve carbonic acid gas in aqueous solution without the use of carbonic acid gas bomb and whereby obtain the process for producing artificial carbonated spring with the unique effect of numerous water vapor bubbles on skin and ruddy skin, through in-depth study, the inventors have found, when oxalic acid aqueous solution is electrolyzed, carbonic acid gas will be produced from the anode; therefore a process for dissolving carbonic acid gas in aqueous solution in high concentration is developed.

Furthermore, the inventors have also found, when oxalic acid aqueous solution is electrolyzed, the carbonic acid gas will be directly released to the atmosphere and can't be dissolved in the aqueous solution in a high concentration to produce enough carbonic acid gas bubbles. In addition, in view that the carbonic acid gas will enter into the body through skin, the inventors believe, the smaller the carbonic acid gas bubble size is, the better the effect will be.

To solve the above problems, the invention is advanced to provide a process for producing carbonic acid gas dissolved in aqueous solution in high concentration at a low cost, which possesses unique effect of carbonated spring, i.e., numerous water vapor bubbles on skin and ruddy skin. Said process is completely different from that for producing carbonated spring by dissolving pressurized carbonic acid gas from a carbonic acid gas bomb in water in the prior art, and doesn't need carbonic acid gas bomb, and is advantageous to environmental protection. The present invention also provides an apparatus for producing carbonic acid gas solution with micro bubbles of carbonic acid gas dissolved as well as carbonated water with carbonic acid gas dissolved in high concentration at a low-cost.

To achieve the above objects, the present invention puts forward the following technical solution.

That is, the process provided by the present invention comprises electrolyzing oxalic acid aqueous solution filled in an electrolytic tank to produce carbonic acid gas by applying a direct current (DC) voltage between the electrodes in the electrolytic tank; at the same time, forming the bubbles of the resulted carbonic acid gas into micro bubbles, and dissolving the above micro bubbles in the oxalic acid aqueous solution by applying ultrasonic wave to the oxalic acid aqueous solution.

According to the present invention, ultrasonic wave is applied to the carbonic acid gas bubbles produced in the oxalic acid aqueous solution by electrolyzing the oxalic acid aqueous solution, so as to form micro bubbles of carbonic acid gas and dissolve the above micro bubbles in the oxalic acid aqueous solution; therefore, the process for producing carbonic acid gas according to the present invention doesn't need such machines as a gas dissipation device, carbonic acid gas bomb, gas separator, and compressor, which were required in the conventional process for producing carbonated spring in the prior art.

Therefore, the process provided by the present invention can easily produce carbonic acid gas solution with micro bubbles of carbonic acid gas dissolved at a low cost.

In addition, in the carbonated water produced as above, ultrasonic wave is applied to the carbonic acid gas bubbles as the carbonic acid gas is produced by electrolyzing carbonic acid aqueous solution, to form micro bubbles and dissolve the micro bubbles in the aqueous solution; as a result, when hands are immersed into the oxalic acid aqueous solution with the above micro bubbles of carbonic acid gas, the unique effect of numerous water vapor bubbles on hand skin and ruddy skin can be obtained.

The process for producing carbonic acid gas solution according to the present invention is characterized in that during the process of electrolyzing oxalic acid aqueous solution in the electrolytic tank, pH value (index of hydrogen ion concentration) of the carbonic acid gas solution is measured, based on which the electrolysis of the oxalic acid aqueous solution is controlled.

As the pH value of carbonic acid gas solution is measured, based on which the electrolysis of oxalic acid aqueous solution is controlled during the process of electrolyzing oxalic acid aqueous solution in the electrolytic tank, it is easy to control the amount of carbonic acid gas produced by electrolyzing the oxalic acid aqueous solution by observing the pH value, so that the concentration of carbonic acid gas is easily controlled at a pH value beneficial to human body.

Furthermore, preferably, the electrolysis of oxalic acid aqueous solution is stopped when the pH value (index of hydrogen ion concentration) of the oxalic acid aqueous solution is in the weak acid range (e.g., pH 5.0~6.8).

A pH value in the weak acid range is beneficial to human body; in addition, by electrolyzing the oxalic acid aqueous solution to above weak acid pH value, 0.1-1 million times of carbon dioxide will be produced in the oxalic acid aqueous solution.

That is, if the pH value increases by 1, the amount of carbon dioxide produced at the anode will increase by 10 times; as a result, 0.1-1 million times of carbon dioxide will be produced in the oxalic acid aqueous solution.

When oxalic acid is dissolved in aqueous solution, the oxalic acid aqueous solution has a highly acidic pH value of 0.01. By electrolyzing the oxalic acid aqueous solution, the pH value will increase gradually and the carbonic acid gas only contributes to the increased pH value part. When the pH value increases to the weak acid range (e.g., pH 5.01~6.8), the concentration of carbonic acid gas in the solution with micro bubbles of carbonic acid gas dissolved will become thick enough to deliver the unique effect of numerous water vapor bubbles on skin and ruddy skin.

In addition, to facilitate carbonic acid gas to enter into body through skin, preferably ultrasonic wave is applied to form the carbonic acid gas bubbles into micro bubbles.

The process provided by the present invention is characterized in that the process for producing carbonic acid gas is obtained by applying a DC voltage between the electrodes in an electrolytic tank to electrolyze the oxalic acid aqueous solution in said electrolytic tank, so as to produce carbonic acid gas, and whereby thus produced carbonic acid gas solution is dissolved in the oxalic acid aqueous solution; wherein it comprises the step of measuring the pH value of oxalic acid aqueous solution and stopping electrolyzing the oxalic acid aqueous solution when the pH value reaches to the weak acid range.

That is because when the oxalic acid aqueous solution is electrolyzed and when the pH value increases to the weak acid range, the inventors verify the unique effect of carbonated spring, i.e. numerous water vapor bubbles on skin and ruddy skin are obtained even ultrasonic wave is not applied to the oxalic acid aqueous solution during electrolyses.

As described above, whenever the pH value increases by 1, the carbon dioxide produced at the anode will increase by 10 times; as a result, 0.1-1 million times of carbon dioxide will be produced in the oxalic acid aqueous solution. Therefore, when only above amount of carbonic acid gas is produced, there is enough carbonated water in the oxalic acid aqueous solution to deliver the unique effect of carbonated spring, i.e. numerous water vapor bubbles and ruddy skin.

In addition, when the pH value is measured during the process for producing carbonic acid gas solution, some methyl red indicating agent can be added in advance in part of the electrolytic tank containing oxalic acid aqueous solution, so as to control the electrolysis by observing the color of the indicating agent in the container.

That is, when the pH value increases to 5-6 range as the oxalic acid aqueous solution is electrolyzed, the color of methyl red changes in the color change range (above pH range in which the color of methyl red changes is referred to as the color change range), electrolysis is stopped to obtain weak acid carbonic acid gas solution. Such weak acid carbonic acid gas solution in the color change range of methyl red is beneficial to human body.

Furthermore, according to the process provided by the present invention, the oxidation-reduction potential of carbonic acid gas solution can also be measured as the oxalic acid aqueous solution is electrolyzed in the electrolytic tank, and the oxidation-reduction potential is utilized as the criterion to control the electrolysis of oxalic acid aqueous solution.

Before the electrolysis, the oxidation-reduction potential of the oxalic acid aqueous solution is positive (e.g., +300~500 mv); as the oxalic acid aqueous solution is electrolyzed, negative electrons are produced in the oxalic acid aqueous solution, and whereby the oxidation-reduction potential moves to negative.

Finally, the negative oxidation-reduction potential stabilizes at a specific value and will not move to the further negative one; therefore, the above specific value can be used as a criterion to control the electrolysis of oxalic acid aqueous solution and whereby control carbonic acid gas concentration.

Preferably, in this invention, the electrolysis of oxalic acid aqueous solution is stopped before the oxidation-reduction potential of oxalic acid aqueous solution reaches to the negative MV upper limit.

When the oxidation-reduction potential stabilizes at the negative MV upper limit, the oxalic acid aqueous solution will deliver the unique effect of carbonated spring, i.e., numerous water vapor bubbles on skin and ruddy skin.

The structure of the apparatus for producing carbonic acid gas solution according to this invention is shown in FIG. 1.

That is, said apparatus for producing carbonic acid gas solution comprises an electrolytic tank 2, filled with oxalic acid aqueous solution; an electrolyzer 3, designed to electrolyze the oxalic acid aqueous solution in said electrolytic tank 2 to produce carbonic acid gas; an ultrasonic generator 4, designed to be able to apply ultrasonic wave to the electrode configuration area in said electrolytic tank 2 to utilize ultrasonic wave to refine the carbonic acid gas bubbles into micro bubbles and dissolve said micro bubbles in the oxalic acid aqueous solution.

The apparatus is composed of an electrolytic tank 2 containing oxalic acid aqueous solution, an electrolyzer 3, and an ultrasonic generator 4, and therefore it doesn't need the gas dissipation device, carbonic acid gas bomb, gas separator, and compressor that are required by the conventional apparatus for producing carbonated spring in the prior art.

Therefore, the apparatus can easily produce carbonic acid gas solution with dissolved micro carbonic acid gas bubbles at a low cost.

In addition, the apparatus 1 for producing carbonic acid gas solution preferably has a particle size control device 10, which is designed to control said electrolyzer 3 and said ultrasonic generator 4, so as to control the micro bubbles of carbonic acid gas to a certain particle size range.

Said particle size control device 10 can control particle size of micro bubbles of carbonic acid gas by controlling the current applied to the electrolyzer 3 and the voltage applied to the ultrasonic generator 4; therefore, it can easily control carbonic acid gas concentration while controls the particle size of micro bubbles of carbonic acid gas to the optimal size facilitating to enter into human body through skin.

In addition, in the apparatus 1 for producing carbonic acid gas solution according to the present invention, preferably a pH tester 11 is further provided in above electrolytic tank 2, so as to measure the pH value of oxalic acid aqueous solution.

With the pH tester 11 in the electrolytic tank 2, the amount of carbonic acid gas in oxalic acid aqueous solution produced by electrolysis can be easily controlled, the pH value beneficial to skin can be controlled in the weak acid range, and the most suitable carbonated water can be produced.

Furthermore, the apparatus for producing carbonic acid gas solution according to the present invention preferably comprises an operation controller 12 to control said electrolyzer 3 and said ultrasonic generator 4 according to the signal from said pH tester 11.

Since the operation controller 12 controls said electrolyzer 3 and said ultrasonic generator 4 according to the signal from said pH tester 11, the apparatus for producing carbonic acid gas solution can be stopped by operating the operation controller 12 when the pH value reaches to a preset value, and whereby the required amount carbonic acid gas solution can be easily produced by automatic operation.

In the apparatus 1 for producing carbonic acid gas solution according to the present invention, the electrode 7a of said electrolyzer 3 is formed in coil form and the ultrasonic oscillator 4b of said ultrasonic generator 4 is inserted in the inner side of said coil electrode 7a.

In above case, since the ultrasonic oscillator 4b of said ultrasonic generator 4 is inserted at the inner side of coil electrode 7a of said electrolyzer 3, the ultrasonic wave can be effectively and uniformly applied to the bubbles of carbonic acid gas produced from electrode 7a to form micro bubbles. Therefore, carbonic acid gas solution with micro bubbles can be effectively produced.

In the apparatus 1 for producing carbonic acid gas solution according to the present invention, said electrode is in plate form, with multiple electrode assemblies composed of an electrode at anode side and an electrode at cathode side. And the ultrasonic oscillator is inserted into the electrode assembly at the anode side thereof while the above electrode assembly is set with the anode side opposite to each other.

According to the apparatus for producing carbonic acid gas solution provided by the present invention, the electrode assembly can be utilized to improve efficiency of electrolysis, while the electrodes at anode side are arranged opposite to each other, and the ultrasonic oscillator is inserted into the electrodes assembly at the side of anode; therefore, as the carbonic acid gas bubbles are produced from the positive electrodes, ultrasonic wave can be applied to the bubbled directly to form micro bubbles. As a result, carbonic acid gas solution with a large amount of micro bubbles can be produced effectively.

Furthermore, the invention is characterized in that said apparatus for producing carbonic acid gas solution utilizes the process of the present invention which comprises electrolyzing the oxalic acid aqueous solution in the electrolytic tank to produce carbonic acid gas by applying a DC voltage between the electrodes in the electrolytic tank, and dissolving the bubbles in the oxalic acid aqueous solution to produce carbonic acid gas solution; wherein, said apparatus comprises an electrolytic tank 2, filled with oxalic acid aqueous solution; an electrolyzer 3, designed to electrolyze the oxalic acid aqueous solution in said electrolytic tank 2 to produce carbonic acid gas; tester 11, designed to measure pH value of the oxalic acid aqueous solution in the electrolytic tank.

With the pH tester 11, the pH value of oxalic acid aqueous solution in the electrolytic tank can be measured, so that carbonic acid gas solution at a specific pH value (e.g., a pH value in the weak acid range) can be easily obtained.

Furthermore, the present invention is characterized in that the apparatus for producing carbonic acid gas solution is combined with the process provided by the present invention which comprises electrolyzing the oxalic acid aqueous solution in the electrolytic tank to produce carbonic acid gas by applying a DC voltage between the electrodes in the electrolytic tank, and dissolving the bubbles in the oxalic acid aqueous solution to produce carbonice acid gas solution; wherein, said apparatus comprises an electrolytic tank 2, filled with oxalic acid aqueous solution; an electrolyzer 3, designed to electrolyze the oxalic acid aqueous solution in said electrolytic tank 2 to produce carbonic acid gas; a tester 11, designed to measure oxidation-reduction potential of the oxalic acid aqueous solution in the electrolytic tank.

In the above case, carbonic acid gas solution can be easily produced by controlling the oxidation-reduction potential in the apparatus for producing carbonic acid gas solution.

According to the apparatus 1 for producing carbonic acid gas solution, preferably a diaphragm is provided in the electrolytic tank 2 to separate the anode electrodes from the cathode electrodes.

Since a diaphragm is provided in the electrolytic tank 2, the electrodes at the anode side are insulated from that at the cathode side and isolated from the dissolved hydrogen produced on the electrodes at the cathode side; therefore, the concentration of carbonic acid gas in the oxalic acid aqueous solution at the anode side can be effectively improved.

According to the present invention, the carbonated water with oxalic acid aqueous solution as the main component refers to water with oxalic acid aqueous solution which is dissolved with carbonic acid micro bubbles in particular particle size as the main component, said micro bubbles is produced by applying a DC voltage between the electrodes in the electrolytic tank 2 to electrolyze the oxalic acid aqueous solution in electrolytic tank 2 to produce carbonic acid gas, while applying ultrasonic wave to the oxalic acid aqueous solution, to refine the carbonic acid gas bubbles to micro bubbles in particular particle size.

According to the present invention, the carbonated water with oxalic acid aqueous solution which is dissolved with micro bubbles of carbonic acid gas in particular particle size as the main component can deliver the unique effect of carbonated spring, i.e. numerous water vapor bubbles on skin and ruddy skin, and can facilitate the capillary bed to grow and dilate, so as to improve skin blood circulation.

In addition, in the present invention, the carbonated water with oxalic acid aqueous solution as the main component refers to water with oxalic acid aqueous solution with dissolved micro bubbles of carbonic acid gas as the main component, which is produced by applying a DC voltage between the electrodes in the electrolytic tank 2 to electrolyze the oxalic acid aqueous solution in electrolytic tank 2 till the pH value of said oxalic acid aqueous solution reaches to the weak acid range to produce carbonic acid gas, which can deliver the unique effect of carbonated spring, i.e. numerous water vapor bubbles on skin and ruddy skin.

Said carbonated water, due to the high concentration of carbonic acid gas therein, can deliver the unique effect of carbonated spring, i.e. numerous water vapor bubbles on skin and ruddy skin, facilitate the capillary bed to grow and dilate, and improve skin blood circulation.

In addition, according to the present invention, the carbonated water with oxalic acid aqueous solution as the main component refers to carbonated water produced by applying a DC voltage between the electrodes in the electrolytic tank to electrolyze the oxalic acid aqueous solution in the electrolytic tank to produce carbonic acid gas and dissolve the carbonic acid gas bubbles in the oxalic acid aqueous solution; wherein, the oxidation-reduction potential of the oxalic acid aqueous solution is measured, and, when the oxidation-reduction potential reaches to the negative MV upper limit, the electrolysis of said oxalic acid aqueous solution is stopped.

Said carbonated water, in which the concentration of carbonic acid gas is high enough, can deliver the unique effect of carbonated spring, i.e. numerous water vapor bubbles on skin and ruddy skin, facilitate the capillary bed to increase and dilate, and improve skin blood circulation.

In the invention, preferably the concentration of carbonated water is 400 ppm or more.

If the concentration of carbonated water is 400 ppm or more, the unique effect of carbonated spring, i.e., numerous water vapor bubbles on skin and ruddy skin can be obtained. However, if the concentration is less than 400 ppm, the above-mentioned unique effect can't be obtained. Therefore, by controlling the concentration of carbonated water to be 400 ppm or more, the carbonated water that will not decrease the effect of the carbonated water with oxalic acid dissolved with micro bubbles of carbonic acid gas in a particular particle size as the main component can be obtained.

According to the present invention, ultrasonic wave is applied to the carbonic acid gas bubbles produced in the oxalic acid aqueous solution by electrolyzing, so as to form micro bubbles of carbonic acid gas and dissolve above micro bubbles in the oxalic acid aqueous solution; therefore, machines such as the gas dissipation device, carbonic acid gas bomb, gas separator, and compressor, which are required in the process for producing carbonated spring in the prior art, are not necessary.

Therefore, carbonic acid gas solution dissolved with micro bubbles of carbonic acid gas can be easily produced at a low cost according to the present invention.

In addition, in the carbonated water produced as above, ultrasonic wave is applied to the carbonic acid gas bubbles as the carbonic acid gas is produced by electrolyzing, to form micro bubbles and dissolve the micro bubbles in the aqueous solution; as a result, when the hands are placed into the oxalic acid aqueous solution with the above micro bubbles of carbonic acid gas, the unique effect of numerous water vapor bubbles on hand skin and ruddy skin can be obtained.

Figure 1:
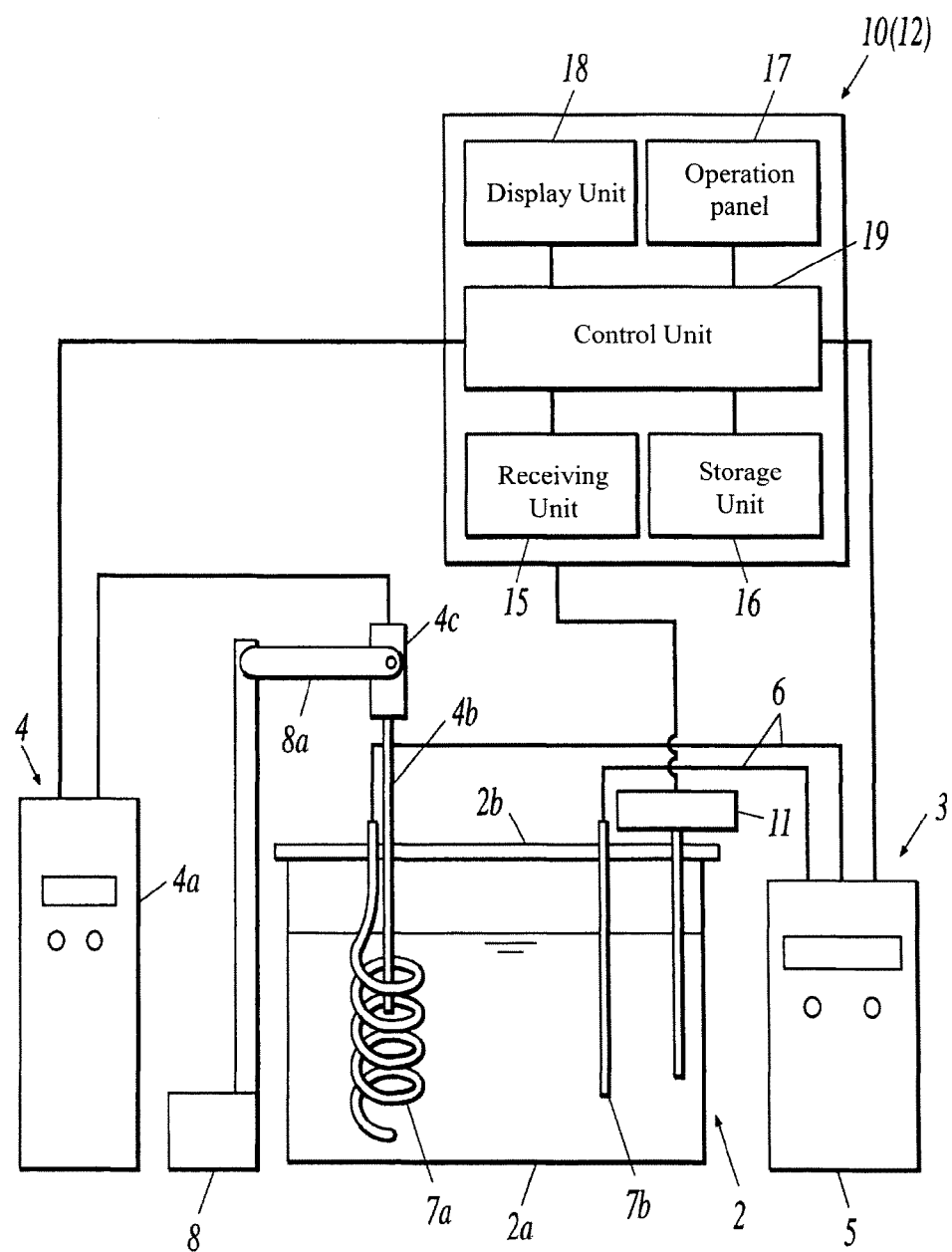
FIG. 1 is a structural view of the apparatus for producing carbonic acid gas solution according to the present invention.

| Brief Description of the numerials |
|---|
| 1: Apparatus for producing carbonic acid gas aqueous solution |
| 2: Electrolytic tank |
| 2a: Main body of electrolytic tank |
| 2b: Cover |

-continued

Brief Description of the numerials

3: Electrolyzer
4: Ultrasonic generator
4a: Main body of the apparatus
4b: Ultrasonic oscillator
4c: Support part
5: Power supply unit
6: Wiring
7a, 7b: Electrode
8: Support base
8a: Mount part
10 (12): Operation controller
11: pH tester
15: Receiving unit
16: Storage unit
17: Operation panel
18: Display unit
19: Control unit

DETAILED DESCRIPTION OF THE EMBODIMENTS

Hereinafter the invention is described by the embodiments, with reference to the attached drawings.

FIG. 1 is a structural view of the apparatus for producing carbonic acid gas aqueous solution according to the present invention. As shown in FIG. 1, the apparatus 1 for producing carbonic acid gas solution comprises: an electrolytic tank 2 filled with oxalic acid aqueous solution, an electrolyzer 3, an ultrasonic generator 4, an operation controller 10 (12) that controls said electrolyzer 3 and said ultrasonic generator 4, and a pH tester 11 designed to measure the pH value (index of hydrogen ion concentration) of oxalic acid aqueous solution in said electrolytic tank 2.

The electrolytic tank 2 has a main body 2a of electrolytic tank filled with oxalic acid aqueous solution and a cover 2b that can cover and/or open the upper opening of said main body 2a of electrolytic tank. The main body 2a of electrolytic tank is made of a transparent material (e.g., transparent glass), so that the electrolysis inside the electrolytic tank can be observed.

The electrolyzer 3 comprises a power supply unit 5 and a pair of electrodes 7a and 7b electrically connected to said power supply unit 5 through wiring 6.

The power supply unit 5 is a device through which preset current can flow in preset time; certainly, preset current can flow through the power supply unit 5 in preset time under certain voltage. With preset voltage from said power supply unit 5 being applied to electrode 7a and 7b, certain constant current (e.g., 5A) flows through the electrodes, so that the oxalic acid aqueous solution in the electrolytic tank 2 is electrolyzed, and carbonic acid gas is produced from the positive electrode 7a; suppose the amount of carbonic acid gas produced is S(mol); then:

$$S = I \times t \times (/9.65 \times 10^4) \times 1/n \quad (1)$$

wherein, I is current in Amperes, t is electrolysis time in seconds, and n is the valence number of oxalic acid (n=2).

Said electrodes 7a and 7b are respectively made of platinum; wherein, electrode 7a (anode) is made in coil form, while electrode 7b (cathode) is made in bar form. In addition, electrodes 7a and 7b are inserted into the oxalic acid aqueous solution in the main body 2a of electrolytic tank through two holes on said cover 2b.

Said ultrasonic generator 4 has a main body 4a and an ultrasonic wave oscillator 4b electrically connected to said main body 4a. Said ultrasonic oscillator 4b is in thin bar form, with its base end (upper end) supported by support part 4c. Said support part 4c is mounted on the mount part 8a on upper end of support base 8, almost perpendicular to said ultrasonic oscillator 4b.

The front end (lower end) of said ultrasonic oscillator 4b passes through said cover 2b and inserts to the oxalic acid aqueous solution in the main body 2a of electrolytic tank. The ultrasonic oscillator 4b is inserted almost coaxially to the center axis of the coil electrode 7a at inner side thereof. In addition, the lower end of said ultrasonic oscillator 4b is set at one side of the upper end of electrode 7a, so that the ultrasonic wave applied from the front end of ultrasonic oscillator 4b acts to the entire electrode 7a.

Said operation controller 10 (12) is designed to control said electrolyzer 3 and said ultrasonic generator 4, and, in one embodiment, it mainly comprises receiving unit 15, designed to receive signals from said pH tester 11; storage unit 16, designed to store the magnitude of ultrasonic wave, magnitude of current, and operating time that can form carbonic acid gas bubbles produced by electrolyzing to the most suitable particle size (nanometer level) in a database; operation panel 17; display unit 18; and control unit 19 that controls said receiving unit 15, storage unit 16, operation panel 17 and display unit 18.

Said receiving unit 15 is designed to receive signals from the pH tester 11 and send the signals to the control unit 19; therefore, it can certainly receive signals of other parameters such as temperature depending on the function of said pH tester 11.

Said storage unit 16 is designed to store the data required for the operation of said apparatus 1 for producing carbonic acid gas solution in advance. Therefore, the data stored in said storage unit 16 can be read with the operation panel 17 to control said apparatus 1 for producing carbonic acid gas solution.

According to one embodiment, said operation controller 10 (12) also serves as a control unit that controls the micro bubbles of carbonic acid gas to a certain particle size range and said storage unit 16 stores the data for controlling the particle size of microbubbles of carbonic acid gas to nanometer level.

The particle size of micro bubbles of carbonic acid gas can be controlled by intensity and action time of ultrasonic wave from the ultrasonic generator 4.

Said operation panel 17 can be used in a key-input or touch-input unit; said display unit 18 can be a LCD.

Said control unit 19 is electrically connected to said receiving unit 15, storage unit 16, operation panel 17, and display unit 18, to control those units; in addition, it also controls operation of said electrolyzer 3 and said ultrasonic generator 4.

In addition, said pH tester 11 is designed to measure the pH value (index of hydrogen ion concentration) of carbonic acid gas solution in the oxalic acid aqueous solution electrolysis process in the electrolytic tank 2. In one embodiment, the pH value signal from said pH tester is sent to the operation controller 10 (12) so that the operation controller 10 (12) can control the electrolysis of oxalic acid aqueous solution on the basis of said pH value.

In one embodiment, said pH tester 11 possesses a function to measure the oxidation-reduction potential with a switch and sends the current signal of oxidation-reduction potential to the operation controller 10 (12), so that the operation controller 10 (12) controls the electrolysis of oxalic acid aqueous solution based on the current signal of said oxidation-reduction potential.

Therefore, in one embodiment, said pH tester 11 can also be used as a tester for oxidation-reduction potential.

Furthermore, the pH value or oxidation-reduction potential can be displayed digitally on the display unit 18. Or, some indicating agent such as methyl red can be added to the electrolytic tank 2 with oxalic acid aqueous solution in advance, so that the electrolysis can be controlled by observing the color of the indicating agent.

That is, when the pH value increases to 5-6 range as the oxalic acid aqueous solution is electrolyzed, the color of methyl red changes in the above color change range (above pH range in which the color of methyl red changes is referred to as the color change range), and if the electrolysis is stopped at this time, weak acid carbonic acid gas aqueous solution can be obtained. Such weak acid carbonic acid gas aqueous solution in the color change range of methyl red is beneficial to human body.

When carbonic acid gas solution is produced with apparatus 1 for producing said carbonic acid gas solution, the oxalic acid aqueous solution in the main body 2a of the electrolytic tank is electrolyzed.

The concentration of said oxalic acid aqueous solution can be 0.1 mol (mol/l) ~1 mol; in view of the solubility of oxalic acid at normal temperature, a concentration of about 0.5 mol is preferred.

In that case, the current passing through electrodes 7a and 7b and the current flow time are preset with the power supply unit 5 of electrolyzer 3.

Preferably, the current flow time is the time required to make the pH value (index of hydrogen ion concentration) of the carbonic acid gas solution increase to the weak acid range (e.g., pH 5.0~6.8).

Furthermore, in order to control the particle size of micro bubbles of carbonic acid gas to the specified range, the intensity of ultrasonic wave generated from said ultrasonic generator is set.

Originally, the oxalic acid aqueous solution filled in said electrolytic tank 2 is strong acid; as it is electrolyzed, the pH value will increase and move towards alkali side.

Furthermore, since the carbonic acid gas only contributes to the increased part of pH value, carbonated aqueous solution in a high concentration can be controlled easily by controlling the pH value.

That is, whenever the pH value increases by 1, the carbon dioxide produced at the anode will increase by 10 times; as a result, 0.1-1 million times of carbon dioxide will be produced in the oxalic acid aqueous solution. Therefore, when above amount of carbonic acid gas is produced, the carbonated water having the unique effect of carbonated spring, i.e. numerous water vapor bubbles on skin and ruddy skin, can be obtained.

Above settings can be made by the operation panel 17 of said operation controller 10 (12); in addition, the ultrasonic generator 4 can also be set; certainly, the power supply unit 5 and the ultrasonic generator 4 can also be controlled by the operation controller 10 (12).

As the oxalic acid aqueous solution is electrolyzed, carbonic acid gas will be produced from the anode (electrode 7a) as indicated in the following scheme:

Carbonic acid gas bubble in visible size can be produced from electrode 7a.

As the electrolysis goes, the main body 4a of said ultrasonic generator 4 is triggered by the control signal from the operation controller 10 (12), so that the ultrasonic oscillator 4b generates ultrasonic wave. At that time, said ultrasonic wave acts directly to the carbonic acid gas bubbles produced from electrode 7a, so that the bubbles rupture and form micro bubbles, which are dissolved in the oxalic acid aqueous solution. Therefore, carbonic acid gas solution with micro bubbles can be produced. Said micro bubbles are referred to as nanometer bubbles (bubble), which are invisible to eyes.

After the oxalic acid aqueous solution is electrolyzed to the weak acid range, the carbon dioxide produced from the anode will increases by 10 times whenever the pH value moves by 1 towards alkali side and the amount of carbon dioxide in the oxalic acid aqueous solution will be of 0.1-1 million times. When above amount of carbon dioxide is produced, the oxalic acid aqueous solution will deliver the unique of carbonated spring, i.e., numerous water vapor bubbles on skin and ruddy skin.

If the particle size of carbonic acid gas bubbles meets the requirements, the ultrasonic generator 4 can be omitted.

In addition, in view of the demand for refining the carbonic acid gas bubbles to facilitate the carbonic acid gas to enter into human body through skin, the apparatus 1 for producing carbonic acid gas solution in this invention preferably has the operation controller 12, which can control said electrolyzer 3 and said ultrasonic generator 4 according to the signal from said pH tester 11.

As described above, such machines as the gas dissipation device, carbonic acid gas bomb, gas separator, and compressor, which are required in the carbonated spring producing method in the prior art, are not necessary to this invention; instead, it utilizes the electrolyzer 3 to electrolyze the oxalic acid aqueous solution filled in said electrolytic tank 2 to produce carbonic acid gas, and utilizes the ultrasonic generator 4 to refine the carbonic acid gas bubbles to micro bubbles, which are then dissolved in the oxalic acid aqueous solution. Therefore, carbonic acid gas solution with micro carbonic acid gas bubbles can be produced at a low cost by the present invention.

In the above case, since the ultrasonic oscillator 4b of said ultrasonic generator 4 is inserted at the inner side of coil electrode 7a of said electrolyzer 3, the ultrasonic wave can be effectively and uniformly applied to the bubbles of carbonic acid gas produced from electrode 7a to form micro bubbles. Therefore, carbonic acid gas solution with micro bubbles dissolved can be produced effectively.

In the apparatus 1 for producing carbonic acid gas solution in the embodiment, said pH tester 11 can be switched to measure the oxidation-reduction potential of oxalic acid aqueous solution in the electrolytic tank with a switch; during the process the oxalic acid aqueous solution in the electrolytic tank is electrolyzed, the oxidation-reduction potential of carbonic acid gas solution is measured and utilized to control electrolysis of the oxalic acid aqueous solution.

Before the electrolysis, the oxidation-reduction potential of oxalic acid aqueous solution is positive (e.g., +300~500 mv); while negative electrons are produced in the oxalic acid aqueous solution as the oxalic acid aqueous solution is electrolyzed, and whereby the oxidation-reduction potential moves towards negative.

Finally, the negative oxidation-reduction potential stabilizes at a specific value and will not move further towards the negative potential side; therefore, above specific value can be used as a basis to control the electrolysis of oxalic acid aqueous solution.

With above assembly, the concentration of carbonic acid gas can be controlled against the oxidation-reduction potential. In one embodiment, when the oxidation-reduction potential stabilizes at the negative MV upper limit, the oxalic acid aqueous solution will deliver the unique effect of carbonated spring, i.e., numerous water vapor bubbles and on skin ruddy skin.

In addition, the pH value or the oxidation-reduction potential is measured and utilized to control the amount of carbonic acid gas, to produce carbonated water. In that way, carbonated water delivering the unique effect of carbonated spring, i.e. numerous water vapor bubbles on skin and ruddy skin, can be obtained; therefore, if desirable particle size of carbonic acid gas bubbles can be obtained, the ultrasonic generator 4 can be omitted.

That is, after the oxalic acid aqueous solution is electrolyzed to the weak acid range, the carbon dioxide produced from the anode will increases by 10 times whenever the pH value moves by 1 towards alkali side; therefore, the amount of carbon dioxide in the oxalic acid aqueous solution will be of 0.1-1 million times. When above amount of carbon dioxide is produced, the oxalic acid aqueous solution will deliver the unique of carbonated spring, i.e., numerous water vapor bubbles on skin and ruddy skin. Therefore, if the desirable particle size of carbonic acid gas bubbles can be obtained, the ultrasonic generator 4 can be omitted.

The case of oxidation-reduction potential is similar to the above mentioned. If the oxidation-reduction potential is negative, the oxalic acid aqueous solution in the electrolytic tank will be near the alkali side, and the oxidation-reduction potential will not go further beyond said specific value; as a result, the same effect as that by the measurement of pH value can be obtained by controlling the apparatus for producing carbonic acid gas solution according to said specific value.

Furthermore, the required amount of carbonic acid gas can be obtained with above formula (1) by electrolyzing the oxalic acid aqueous solution, and whereby the required concentration of carbonic acid gas can be obtained in the carbonic acid gas solution.

In addition, since the carbonated water produced in the producing apparatus with the producing process described in above embodiment has carbonic acid gas in high concentration, when the hands (body) are immersed in the carbonated water, the unique effects such as numerous water vapor bubbles on skin and ruddy skin can be obtained. Therefore, above carbonated water can facilitate the capillary bed to grow and dilate, and can improve skin blood circulation.

Figure 2:
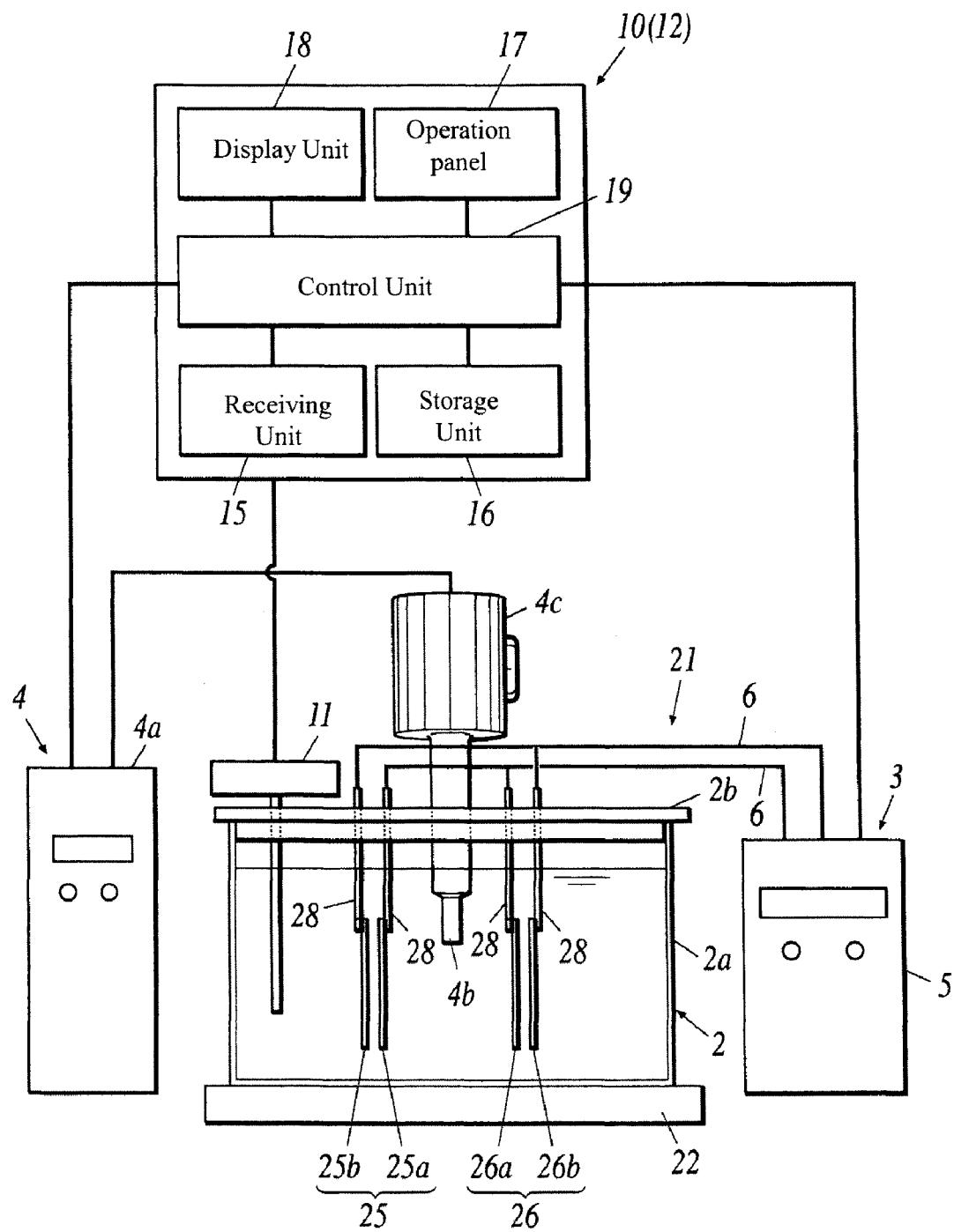
FIG. 2 is a schematic front view of the structure of the apparatus for producing carbonic acid gas solution according to another embodiment of the present invention.
Figure 3:
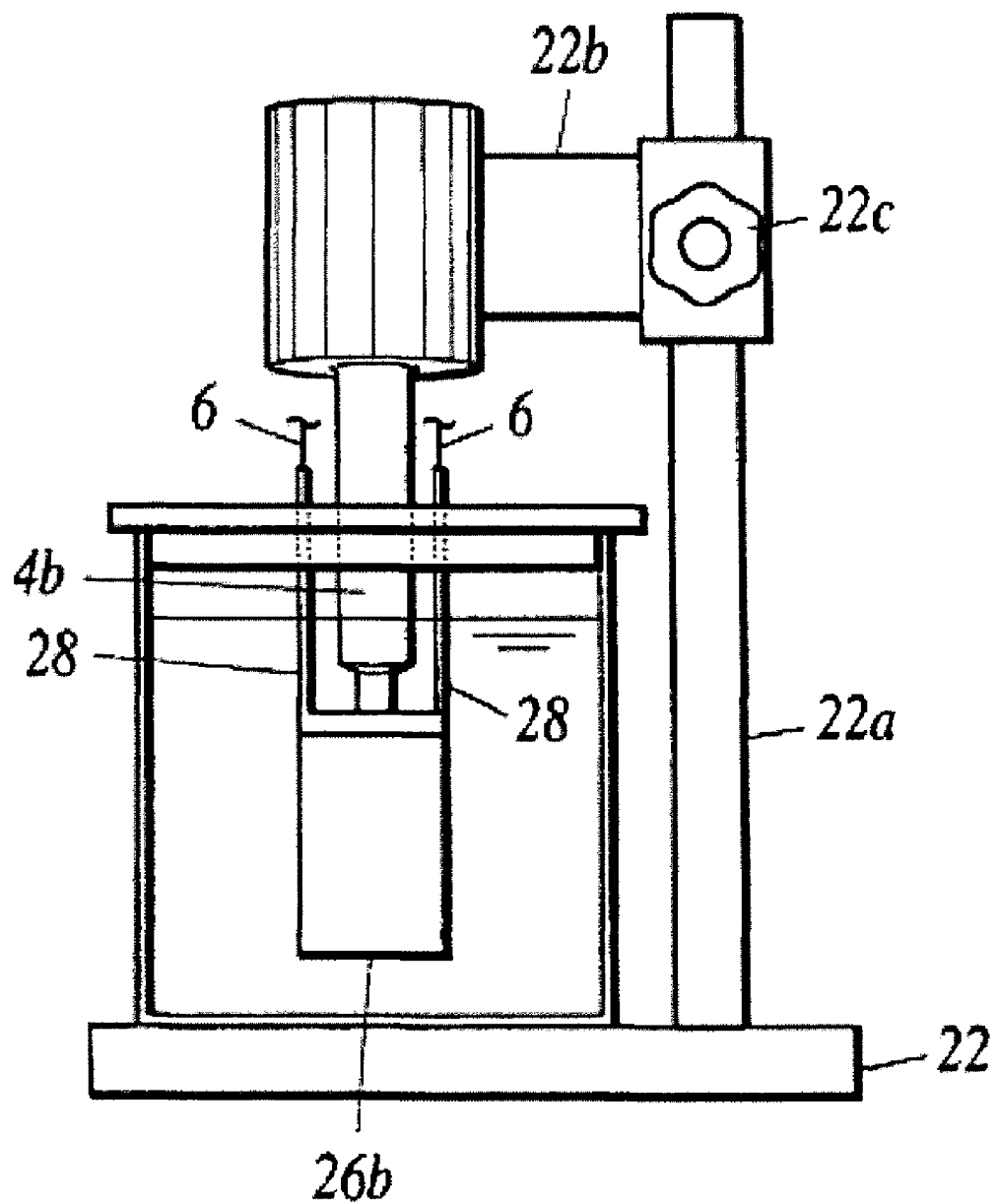
FIG. 3 is a schematic side view of the structure of the apparatus for producing carbonic acid gas solution according to another embodiment of the present invention.
Figure 4:
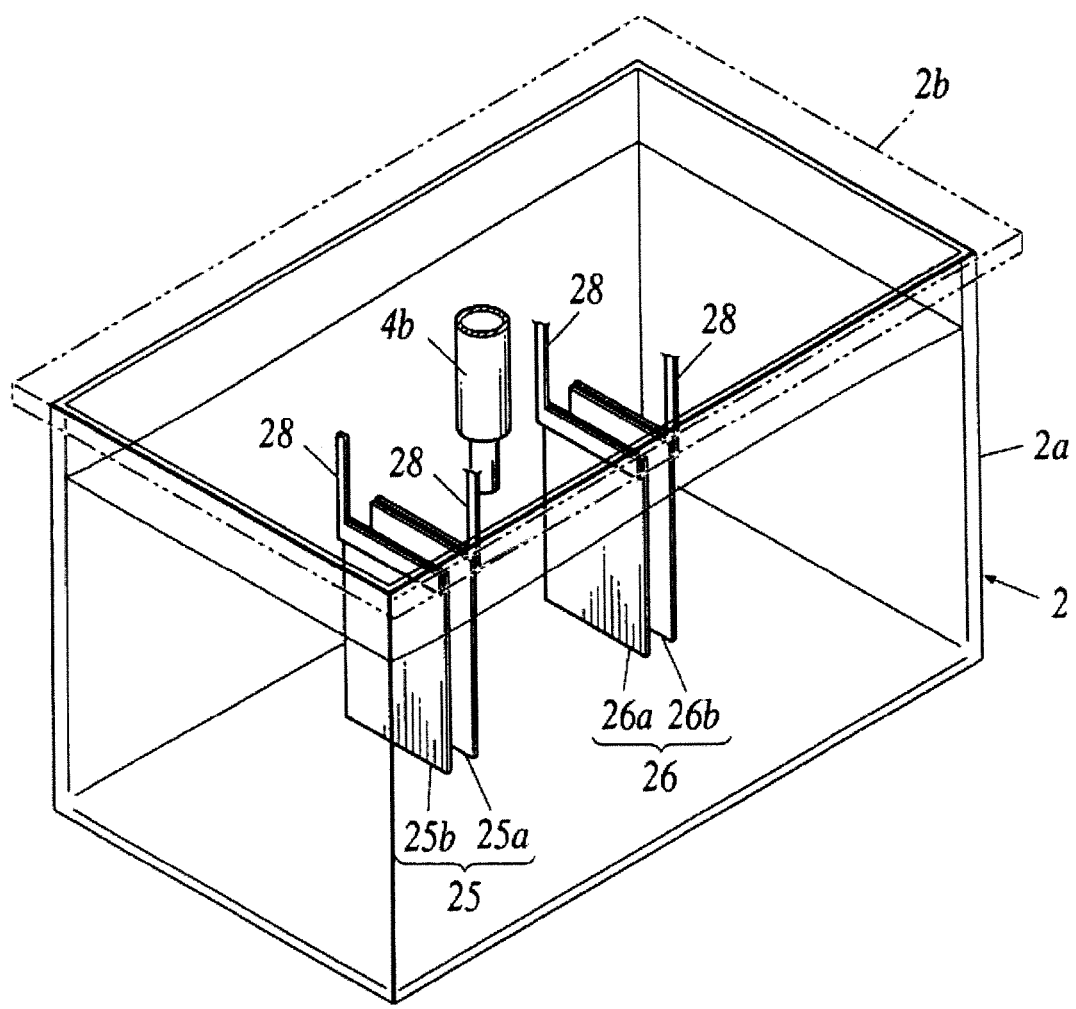
FIG. 4 is a stereoram of the electrode assembly in the electrolytic tank of the apparatus for producing carbonic acid gas solution according to another embodiment of the present invention.

FIG. 2 to FIG. 4 are schematic diagrams of other embodiments of the apparatus for producing carbonic acid gas solution provided in the invention.

What are different between the apparatus for producing carbonic acid gas solution shown in those drawings and those shown in FIG. 1 are the form and configuration of electrodes as well as the configuration of ultrasonic oscillator. Hereinafter the differences are described in detail; the identical parts are denoted with identical numerals, and whereby the description of the identical parts are omitted or simplified.

The apparatus 21 for producing carbonic acid gas solution comprises an electrolytic tank 2, with a main body 2a on a support base 22 and an cover 2b that can operably cover the upper opening of said main body 2a of the electrolytic tank; an electrolyzer 3; an ultrasonic generator 4; an operation controller 10 (12), designed to control said electrolyzer 3 and said ultrasonic generator 4; a pH tester 11, designed to measure the pH value (index of hydrogen ion concentration) of oxalic acid aqueous solution filled in said electrolytic tank 2.

In addition, the pH tester 11 in above embodiment can also be switched to measure the oxidation-reduction potential.

Said electrolyzer 3 comprises a power supply unit 5 and four electrodes 25a, 25b, 26a and 26b electrically connected to said power supply unit 5 with wiring 6. Said electrodes 25a and 26a are anode, while said electrodes 25b and 26b are cathode. Said electrodes 25a and 25b constitute an electrode assembly 25, while said electrodes 26a and 26b constitute an electrode assembly 26. That is, in this embodiment, there has two electrode assemblies 25 and 26.

Said electrodes 25a, 25b, 26a and 26b are rectangular thin plates almost in the same shape; furthermore, they are made of platinum or formed by coating platinum on titanium plates, titanium alloy plates, or appropriate metal plates.

Said electrodes 25a, 25b, 26a and 26b are connected at upper end to one end of an L-shape conductor 28 respectively; the other end of said conductor 28 protrudes upwards above the electrolytic tank 2. The other end of said conductor 28 is connected on upper end with said wiring 6.

In addition, said electrode 25a is arranged parallel to said electrode 25b at a specified spacing; similarly, said electrode 26 is arranged parallel to said electrode 26b at a specified spacing.

As shown in the drawings, said electrode assemblies 25 and 26 can be arranged vertically or horizontally. If said electrode assemblies 25 and 26 are arranged horizontally, appropriate holes are provided on said electrodes, so that the bubbles produced from said electrodes can pass through said holes upwards.

In addition, the electrode assemblies 25 composed of electrodes 25a and 25b are separated from the electrode assemblies 26 composed of electrodes 26a and 26b in left-to-right direction, with said ultrasonic oscillator 4b mounted between them.

The support part 4c of said ultrasonic oscillator 4b is supported on the vertical pole 22a on the support base 22 by means of an arm 22b. Said arm 22b can move in vertical direction and rotate in horizontal direction along the pole 22a, and can be fixed to said pole 22a at a specified position in vertical direction and can't rotate in horizontal direction by screwing the handle 22c. In that way, the position of said ultrasonic oscillator 4b can be adjusted vertically and horizontally.

When carbonic acid gas solution is produced with said apparatus 21 for producing carbonic acid gas solution, the oxalic acid aqueous solution in the main body 2a of the electrolytic tank is electrolyzed.

The concentration of said oxalic acid aqueous solution can be 0.1 mol (mol/l) ~1 mol; in view of the solubility of oxalic acid at normal temperature, a concentration of about 0.5 mol is preferred.

Furthermore, with the current flowing through the electrode assemblies 25 and 26 and the current flow time preset with the power supply unit 5 of said electrolyzer 3, the main body 4a of said ultrasonic generator 4 is triggered during the electrolysis process, so that ultrasonic wave is produced from the ultrasonic oscillator 4b.

In addition, in order to control the particle size of micro bubbles of carbonic acid gas to the specified range, the intensity of ultrasonic wave generated from said ultrasonic generator 4 is set.

The current flow time herein is the time required to make the pH value (index of hydrogen ion concentration) of the carbonic acid gas solution increase to the weak acid range (e.g., pH 5.0~6.8). When the oxalic acid aqueous solution becomes weak acid, the apparatus 21 for producing carbonic acid gas solution is stopped.

In that way, said ultrasonic wave acts directly to the carbonic acid gas bubbles produced from electrode 25a and 26a, so that the bubbles rupture and form micro bubbles, which are dissolved in the oxalic acid aqueous solution.

In the embodiments described above, the electrodes are in plate form, and multiple electrode assemblies 25 and 26 composed of electrodes 25a, 25b, 26a and 26b are provided, so as to produce a large amount of carbonic acid gas.

In addition, the ultrasonic oscillator 4b is provided between the electrode assemblies 25 and 26, so that the ultrasonic wave acts effective and uniformly to the bubbles produced from said electrode 25a and 26a, in order to form micro bubbles. As a result, carbonic acid gas solution with a large amount of micro bubbles can be produced effectively.

In addition, in the embodiments, the oxalic acid aqueous solution can be electrolyzed to weak acid by controlling the pH value. As the weak acid oxalic acid aqueous solution is electrolyzed, the carbon dioxide produced from the anode will increase by 10 times whenever the pH value moves by 1 towards alkali side; therefore, the amount of carbon dioxide in the oxalic acid aqueous solution will be of 0.1-1 million times. When above mount of carbon dioxide is produced, the oxalic acid aqueous solution will deliver the unique effect of carbonated spring, i.e., numerous water vapor bubbles on skin and ruddy skin. Therefore, if the particle size of carbonic acid gas bubbles meets the requirement, the ultrasonic generator 4 can be omitted.

Furthermore, in the apparatus 1 for producing carbonic acid gas solution in the embodiments, said pH tester 11 can be switched to measure the oxidation-reduction potential of oxalic acid aqueous solution in the electrolytic tank with a switch; during the process the oxalic acid aqueous solution in the electrolytic tank is electrolyzed, the oxidation-reduction potential of carbonic acid gas solution is measured and utilized to control electrolysis of the oxalic acid aqueous solution.

Before the electrolysis, the oxidation-reduction potential of oxalic acid aqueous solution is positive (e.g., +300~500 mv); as the oxalic acid aqueous solution is electrolyzed, negative electrons are produced in the oxalic acid aqueous solution, and whereby the oxidation-reduction potential moves towards negative.

Finally, the negative oxidation-reduction potential stabilizes at a specific value and will not move further towards the negative potential side; therefore, above specific value can be used as a standard to control the electrolysis of oxalic acid aqueous solution.

In the embodiments, by measuring the pH value or the oxidation-reduction potential instead of applying ultrasonic wave, carbonated water with unique effect of carbonated spring, i.e. numerous water vapor bubbles on skin and ruddy skin, can be produced.

In the embodiments described above, the electrodes are in plate form, and multiple electrode assemblies 25 and 26 composed of electrodes 25a, 25b, 26a and 26b are provided, so as to produce a large amount of carbonic acid gas.

In addition, the ultrasonic oscillator 4b is provided between the electrode assemblies 25 and 26, so that the ultrasonic wave acts effective and uniformly to the bubbles produced from said electrode 25a and 26a, in order to form micro bubbles. As a result, carbonic acid gas solution with a large amount of micro bubbles can be produced effectively.

Figure 5:
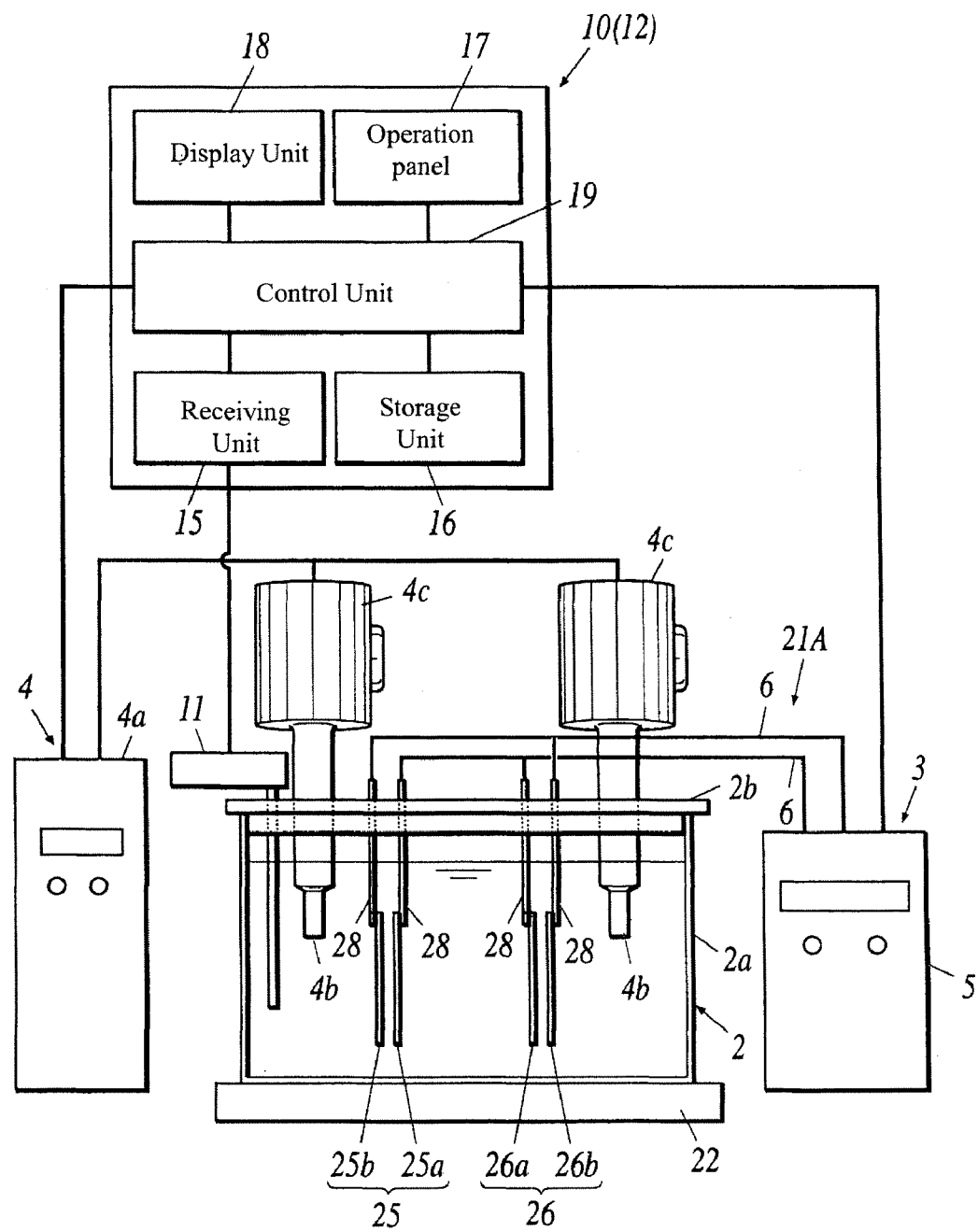
FIG. 5 is the first variant of the apparatus for producing carbonic acid gas solution shown in FIG. 3.
Figure 6:
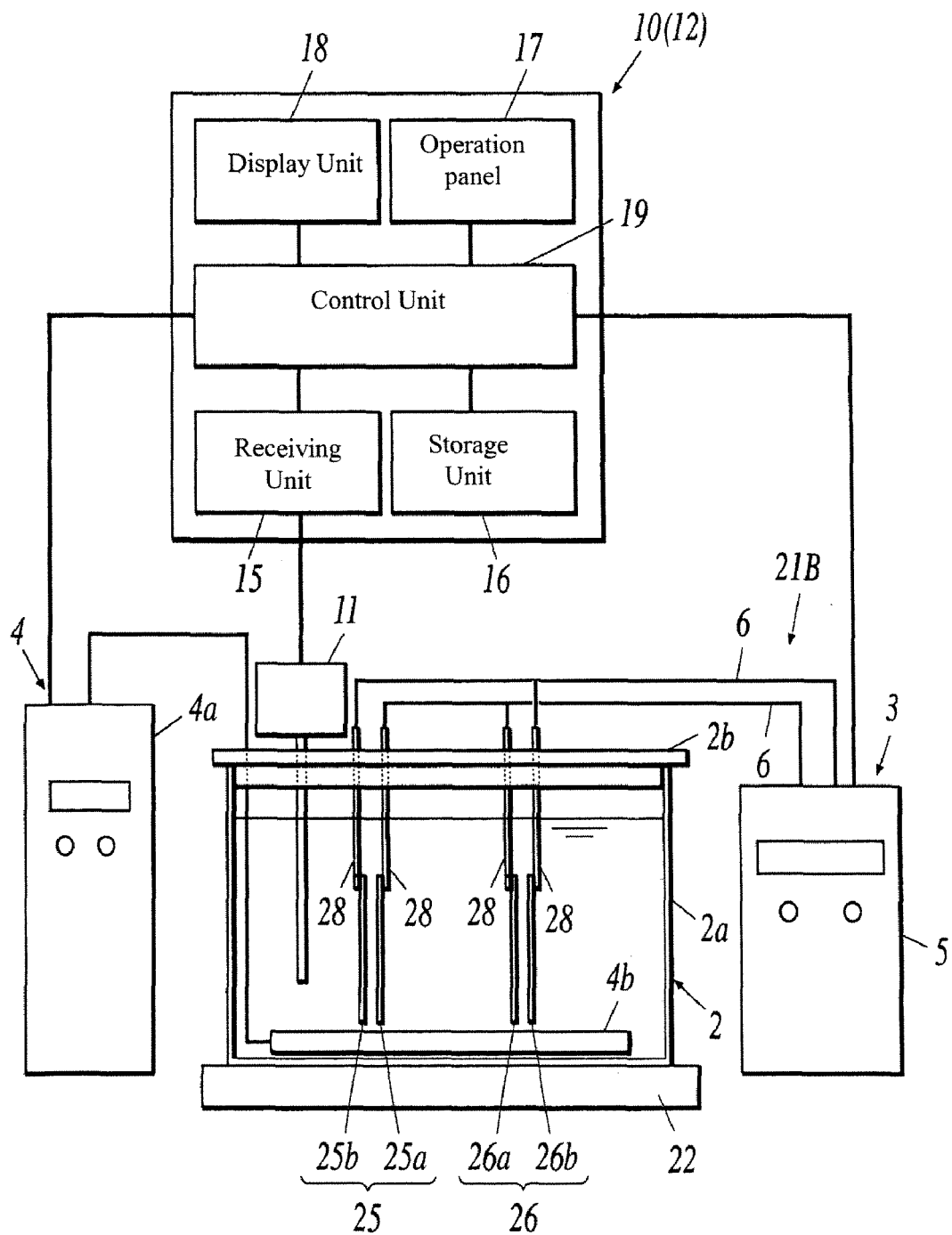
FIG. 6 is the second variant of the apparatus for producing carbonic acid gas solution shown in FIG. 3.

FIG. 5 and FIG. 6 are schematic diagrams of other embodiments of said apparatus 21 for producing carbonic acid gas solution, with two electrode assembies 25 and 26.

In the apparatuses 21A and 21B for producing carbonic acid gas solution shown in FIG. 5 and FIG. 6, the parts identical to those in the apparatus 21 for producing carbonic acid gas solution are denoted with the same numerals; therefore, those identical parts are omitted in the description.

The apparatus 21A for producing carbonic acid gas solution shown in FIG. 5 has two ultrasonic oscillators 4b, which are mounted on inner walls opposite to each other in the main body 2a of electrolytic tank. Therefore, the electrodes 25b and 26b near the ultrasonic oscillators 4b become the anode, from which carbonic acid gas is produced.

In the apparatus 21B for producing carbonic acid gas solution in another embodiment shown in FIG. 6, the ultrasonic oscillator 4b is horizontally mounted on the bottom of the main body 2a of electrolytic tank; therefore, the electrodes 25a and 26a or the electrodes 25b and 26b can be used as anodes to produce carbonic acid gas.

Hereafter the invention is further detailed by the examples; however, it is noted that the invention is not limited to these examples.

EXAMPLE 1

In this example, as an experiment for producing carbonic acid gas solution, 0.1 mol/l oxalic acid aqueous solution is filled in the electrolytic tank 2. When the ultrasonic generator 4 (produced by TOMY SEIKO Co, Ltd., model UD-200) is used to produce ultrasonic wave for 60 min., the electrolyzer 3 is utilized to electrolyze the oxalic acid aqueous solution. In addition, an electrolytic tank for thin-layer chromatography is used as the electrolytic tank 2.

The ultrasonic generator 4 operates at a frequency of 20 kHz; the current is 300 mA; the voltage applied on the electrolyzer 3 is 10V.

In addition, the average particle size of micro bubbles of carbonic acid gas in the carbonic acid gas solution is measured as 3930 nm.

In above particle size measurement, a quasi-elastic light scatter photometer (produced by Otsuka Electronics Co., Ltd., model ELS-8000) is used. In addition, the scattering intensity is also measured with said quasi-elastic light scatter photometer. The scattering intensity, which is an indicator for concentration of micro bubbles of carbonic acid gas in the carbonic acid gas solution, is measured twice, and the first result is 55969±21321, while the second result is 60471±17456.

For comparison, the particle size and the scattering intensity of micro bubbles of carbonic acid gas in carbonated spring containing 1000 ppm carbonic acid gas are measured. The result is: the average particle size is 4327 nm, the first scattering intensity result is 12042±4433, and the second scattering intensity is 10004±1390. Above carbonated spring is produced by the apparatus for producing carbonated spring (C. C. Carbo) produced by Mitsubishi Rayon Co., Ltd.

Above results are shown in Table 1.

TABLE 1

| | Average particle size of micro bubbles (nm) | Scattering intensity | |
|---|---|---|---|
| Carbonic acid gas solution (this invention) | 3930 | First time<br>Second time | 55969 ± 21321<br>60471 ± 17456 |
| Carbonated spring (for comparison) | 4327 | First time<br>Second time | 12042 ± 4433<br>10004 ± 1390 |

As shown in above Table, the average particle size of micro bubbles of carbonic acid gas in the carbonic acid gas solution produced by the apparatus for producing carbonic acid gas solution according to the present invention is almost identical to or slightly smaller than that of the micro bubbles of carbonic acid gas in the carbonated spring.

In addition, the scattering intensity of the carbonic acid gas solution is higher than that of the carbonated spring. Therefore, it is anticipated that the concentration of micro bubbles of carbonic acid gas in the carbonic acid gas solution is higher than that in the carbonated spring. Furthermore, unlike the process for producing carbonated spring, there is no discharge of a large amount of pressurized carbonic acid gas from the carbonic acid gas bomb to the atmosphere, so the process provided by the present invention is advantageous to the environment.

After the hands are immersed in the carbonated water provided as above for 5 min., it is observed that small bubbles appear on and attach to the hands immersed in the carbonated water gradually when the hands are observed for the bubble state and the ruddy extent of the skin; furthermore, after the hands were drawn back from the carbonated water, it is confirmed that only the part of the hands immersed in the carbonated water (only the part immersed under the water) becomes apparently ruddy.

For comparisons, after the hands are immersed in the carbonated spring produced by the apparatus for producing carbonated spring (C. C. Carbo) produced by Mitsubishi Rayon Co., Ltd., it is also observed that there are numerous water vapor bubbles on the skin and the skin becomes ruddy.

The concentration of carbonic acid gas in the carbonated spring produced by the apparatus for producing carbonated spring (C. C. Carbo) produced by Mitsubishi Rayon Co., Ltd. is 1000 ppm; to attain the same effect, the concentration of carbonic acid gas is also designed as 1000 ppm in this invention.

The longer the electrolysis time is, the higher the concentration of carbonic acid gas will be. However, if the carbonic acid gas at 400 ppm concentration for therapeutic effect is only required, it is permitted that the electrolysis time is short.

EXAMPLE 2

In this example, as an experiment for producing carbonic acid gas solution by the apparatus 21 for producing carbonic acid gas solution shown in FIG. 2 to FIG. 4, 31 0.1 mol/l oxalic acid aqueous solution is filled in the electrolytic tank 2, and when the ultrasonic generator 4 (produced by TOMY SEIKO Co, Ltd., model UD-200) is used to produce ultrasonic wave for 75 min., the electrolyzer 3 is utilized to electrolyze the oxalic acid aqueous solution.

In addition, an electrolytic tank for thin-layer chromatography is used as the electrolytic tank 2.

The ultrasonic generator 4 operates at a frequency of 20 kHz; the current through the electrolyzer 3 is 1A constant current.

In addition, the scattering intensity of carbonic acid gas contained in the produced carbonic acid gas solution is measured as 294238±563470. In above scattering intensity measurement, a quasi-elastic light scatter photometer (produced by Otsuka Electronics Co., Ltd., model ELS-8000) is used.

Compared with the scattering intensity of carbonated spring produced by the apparatus for producing carbonated spring (C. C. Carbo) produced by Mitsubishi Rayon Co., Ltd. shown in Table 1, the above scattering intensity is almost 30 times higher; therefore, the carbonic acid gas is dissolved in the carbonic acid gas solution.

In addition, after the hands are immersed in the above carbonic acid gas solution for 5 min., the unique effect of numerous water vapor bubbles on the skin and the ruddy skin can be observed.

Therefore, the above carbonated water can facilitate the capillary bed to grow and dilate, and can improve skin blood circulation.

Furthermore, unlike the process for producing carbonated spring, there is no discharge of a large amount of pressurized carbonic acid gas from the carbonic acid gas bomb to the atmosphere, so the process provided by the present invention is advantageous to the environment.

EXAMPLE 3

In this example, as an experiment for producing carbonic acid gas solution, 31 0.1 mol/l oxalic acid aqueous solution is filled in the electrolytic tank 2 and electrolyzed for 40 min. The pH value (index of hydrogen ion concentration) of the carbonic acid gas solution is measured with pH tester 11; the result is shown in FIG. 7.

In this example, only electrolysis is carried out, and no ultrasonic wave is applied; the current flowing through the electrolyzer 3 is 1A constant current.

Figure 7:
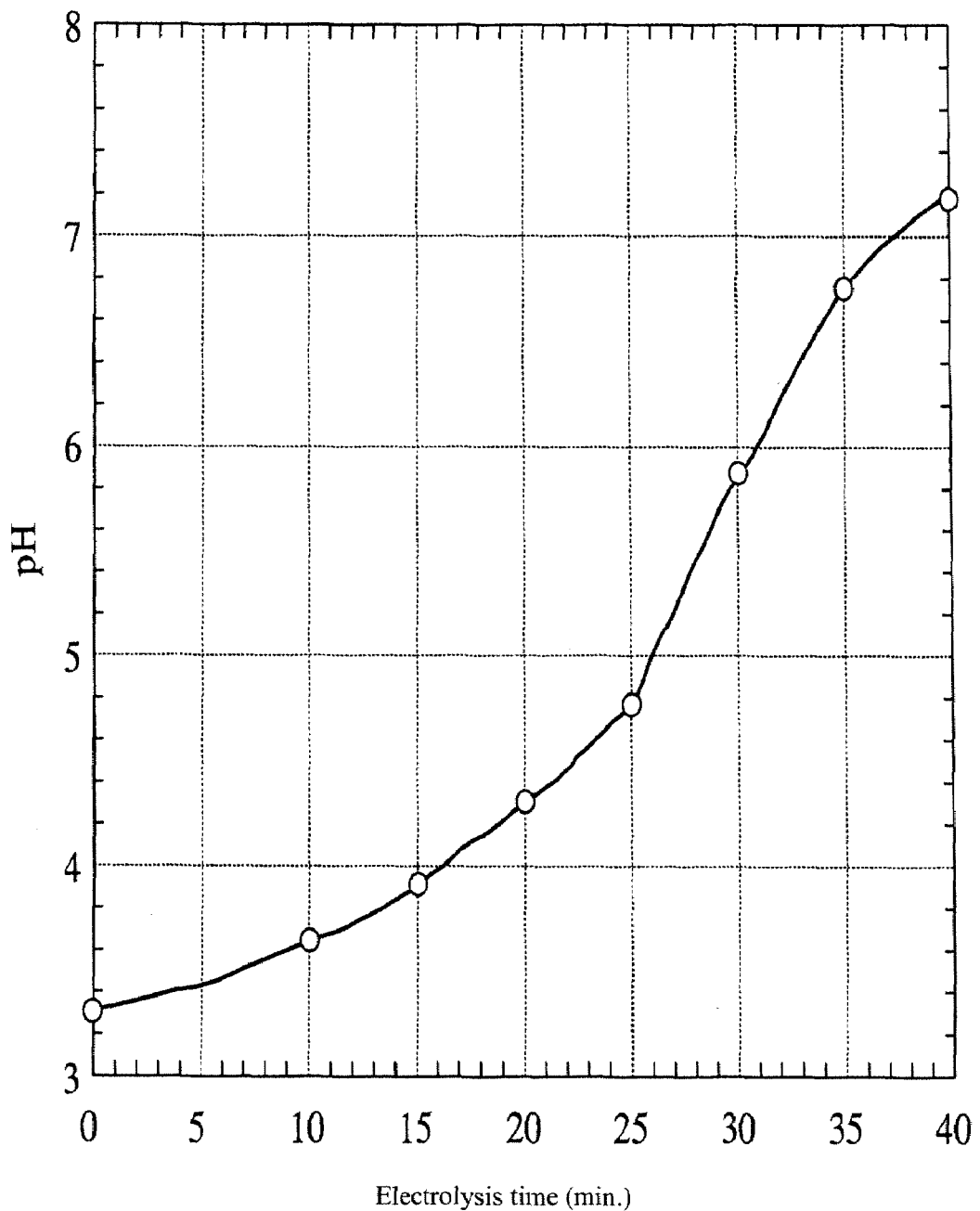
FIG. 7 shows the relationship of electrolysis time vs. pH value in the carbonic acid gas aqueous solution.

As shown in FIG. 7, at the beginning, the oxalic acid aqueous solution filled in above electrolytic tank 2 is strong acid; as the above oxalic acid aqueous solution is electrolyzed, the pH value increases and moves towards strong alkali side.

When the carbonic acid gas solution produced as above reaches to the weak acid range, the electrolysis is stopped, and the weak acid carbonic acid gas solution is taken out. After the hands are immersed in the carbonic acid gas solution for 5 min., it is observed that small bubbles appear on and attach to the hands immersed in the carbonated water gradually when the state of the bubble attaching to the hands and the ruddy extent of the skin are observed; furthermore, after the hands were drawn back from the carbonated water and observed at room temperature, it is confirmed that only the part of the hands immersed in the carbonated water (only the part immersed under the water) becomes apparently ruddy.

EXAMPLE 4

In this example, as an experiment for producing carbonic acid gas solution, 31 0.2 mol/l oxalic acid aqueous solution is filled in the electrolytic tank 2 and electrolyzed for 30 min. with the apparatus shown in FIG. 2; and then the oxidation-reduction potential of the solution is measured. In this example, only electrolysis is carried out, and no ultrasonic wave is applied; the current flowing through the electrolyzer 3 is 4.54A constant current.

The result is shown in Table 2.

TABLE 2

| Time (min.) | Oxidation-reduction potential (MV) |
| --- | --- |
| 0 | +468 |
| 0.5 | +297 |
| 1 | +33 |
| 2 | +17 |
| 3 | −139 |
| 4 | −256 |
| 5 | −259 |
| 6 | −258 |
| 7 | −259 |
| 8 | −259 |
| 9 | −259 |

TABLE 2-continued

| Time (min.) | Oxidation-reduction potential (MV) |
|---|---|
| 10 | −258 |
| 15 | −258 |
| 20 | −260 |
| 25 | −262 |
| 30 | −265 |

In this example, the oxidation-reduction potential reaches to about −258 MV and no longer changes after electrolysis for 5 min. After the carbonic acid gas solution is electrolyzed for 30 min. and the hands are immersed in the solution for 5 min., it is observed that small bubbles appear on and attach to the hands immersed in the carbonated water gradually when the state of the bubble attaching to the hands and the ruddy extent of the skin are observed; furthermore, after the hands were drawn back from the carbonated water, it is confirmed that only the part of the hands immersed in the carbonated water (only the part immersed under the water) becomes ruddy apparently.

INDUSTRIAL APPLICABILITY

As described above, the machines such as a gas dissipation device, carbonic acid gas bomb, gas separator, and compressor, which are required in the process for producing carbonated spring in the prior art, are not necessary according to the present process, which, instead, utilizes an electrolyzer to electrolyze the oxalic acid aqueous solution filled in the electrolytic tank to produce carbonic acid gas, and at the meantime utilizes an ultrasonic generator to refine the carbonic acid gas bubbles to micro bubbles, which are then dissolved in the oxalic acid aqueous solution; therefore, the carbonic acid gas solution with micro bubbles of carbonic acid gas can be produced easily and at a low cost, and with no discharge of undesirable carbonic acid gas to the atmosphere, and whereby being beneficial to the environment according to the process provided by the present invention.

In addition, according to the present invention, the oxalic acid aqueous solution filled in the electrolytic tank is electrolyzed to produce carbonic acid gas, while an ultrasonic generator is utilized to refine the carbonic acid gas bubbles to micro bubbles; through setting the intensity of above ultrasonic wave to a specified value, the micro bubbles of carbonic acid gas can be controlled to a certain particle size range, so that oxalic acid aqueous solution dissolved with carbonic acid gas bubbles in certain particle size can be produced; therefore, the process provided by the present invention can produce just a required amount of carbonated spring that can facilitate the capillary bed to grow and dilate and improve skin blood circulation.

Furthermore, the carbonated water produced as above, with oxalic acid aqueous solution dissolved with micro bubbles of carbonic acid gas as the main component, can deliver the unique effect of carbonated spring of numerous water vapor bubbles on skin and ruddy skin and facilitate the capillary bed to grow and dilate, and improve skin blood circulation.

What is claimed is:

1. A process for producing a carbonic acid gas solution, the process comprising:
    electrolyzing oxalic acid aqueous solution in an electrolytic tank to obtain carbonic acid gas by applying a DC voltage between electrodes in the electrolytic tank; and
    dissolving a bubble of the resulted carbonic acid gas in the oxalic acid aqueous solution to obtain said carbonic acid gas solution;
    wherein the electrolyzing comprises measuring a pH value of said oxalic acid aqueous solution and stopping the electrolyzing when said pH value reaches the weak acid range, at a final pH value of from 5.0 to 6.8,
    a starting pH value of said oxalic acid aqueous solution is approximately 0.01, and
    the carbonic acid gas solution is suitable for artificial carbonated spring water.

2. The process of claim 1, further comprising:
    adding an indicating agent into the electrolytic tank filled with oxalic acid aqueous solution before electrolyzing to indicate a color of the indicating agent in the electrolytic tank, and
    controlling the electrolysis by observing the color of the indicating agent in the electrolytic tank.

* * * * *

UNITED STATES PATENT AND TRADEMARK OFFICE
CERTIFICATE OF CORRECTION

PATENT NO. : 8,409,420 B2
APPLICATION NO. : 11/917473
DATED : April 2, 2013
INVENTOR(S) : Yoh Sano et al.

It is certified that error appears in the above-identified patent and that said Letters Patent is hereby corrected as shown below:

In the Specifications:

Column 4 Line 23 "pH 5.01~6.8)," should read --pH 5.0~6.8),--
Column 7 Line 5 "carbonice acid" should read --carbonic acid--
Column 9 Line 59 "$S=I\times t\times(/9.65\times10^4)\times1/n$" should read --$S=I\times t\times(1/9.65\times10^4)\times1/n$--

Signed and Sealed this
Eighteenth Day of June, 2013

Teresa Stanek Rea
*Acting Director of the United States Patent and Trademark Office*